United States Patent [19]

Lee

[11] Patent Number: 4,474,257
[45] Date of Patent: Oct. 2, 1984

[54] SAFETY APPARATUS AND METHOD FOR VEHICULAR IMPACT

[76] Inventor: Joseph K. Lee, 10616 Bramblebusch Ave., Whittier, Calif. 90604

[21] Appl. No.: 417,178

[22] Filed: Sep. 10, 1982

[51] Int. Cl.³ .............................................. B60R 19/00
[52] U.S. Cl. ..................................... 180/271; 293/118
[58] Field of Search ................. 180/271, 282; 293/118, 293/119, 132, 134

[56] References Cited

U.S. PATENT DOCUMENTS

| | | | |
|---|---|---|---|
| 3,346,292 | 10/1967 | Lundman | 293/118 |
| 4,048,613 | 9/1977 | Ito et al. | 180/271 |
| 4,168,499 | 9/1979 | Matsumura et al. | 180/271 |
| 4,192,538 | 3/1980 | Gulli | 293/134 |

FOREIGN PATENT DOCUMENTS 2309139  8/1973  Fed. Rep. of Germany ...... 293/119

Primary Examiner—Joseph F. Peters, Jr.
Assistant Examiner—Ross Weaver

[57] ABSTRACT

This invention is a method and apparatus for detecting the impending impact of a moving vehicle with another object whether the moving vehicle is approaching, or being approached by the vehicle containing the apparatus for such detection. It is further characterized by the placement of impact air bags between the body and the forward or rearward bumper of the vehicle and by an apparatus and method for partially filling such air bags so as to prepare such vehicle for impact with another object or vehicle. The actual impact between the vehicle and said other object further rapidly fills the air bag to its fullest capacity in order to allow the minimal damage to the two vehicles and the passengers therewithin.

9 Claims, 6 Drawing Figures

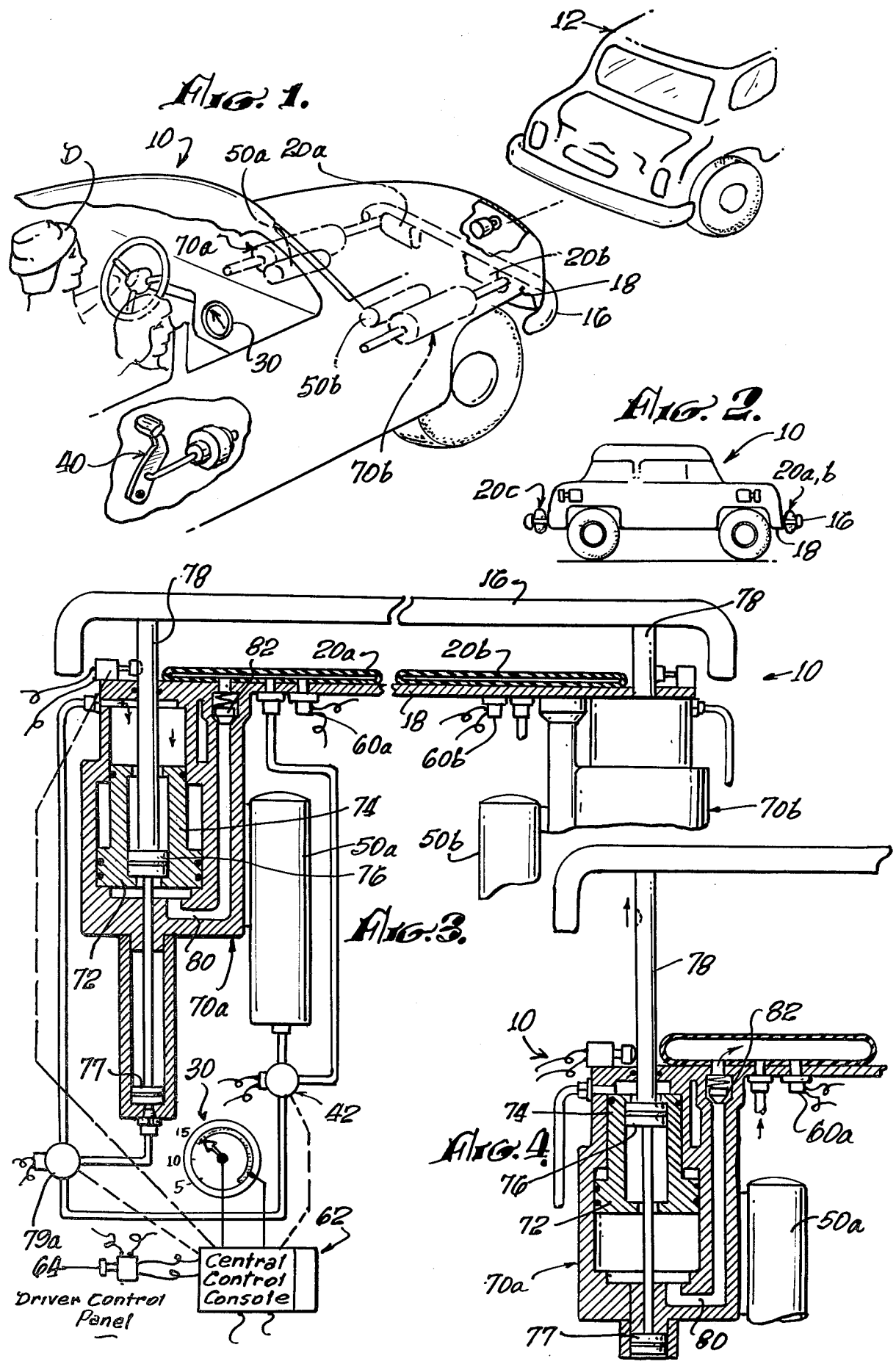

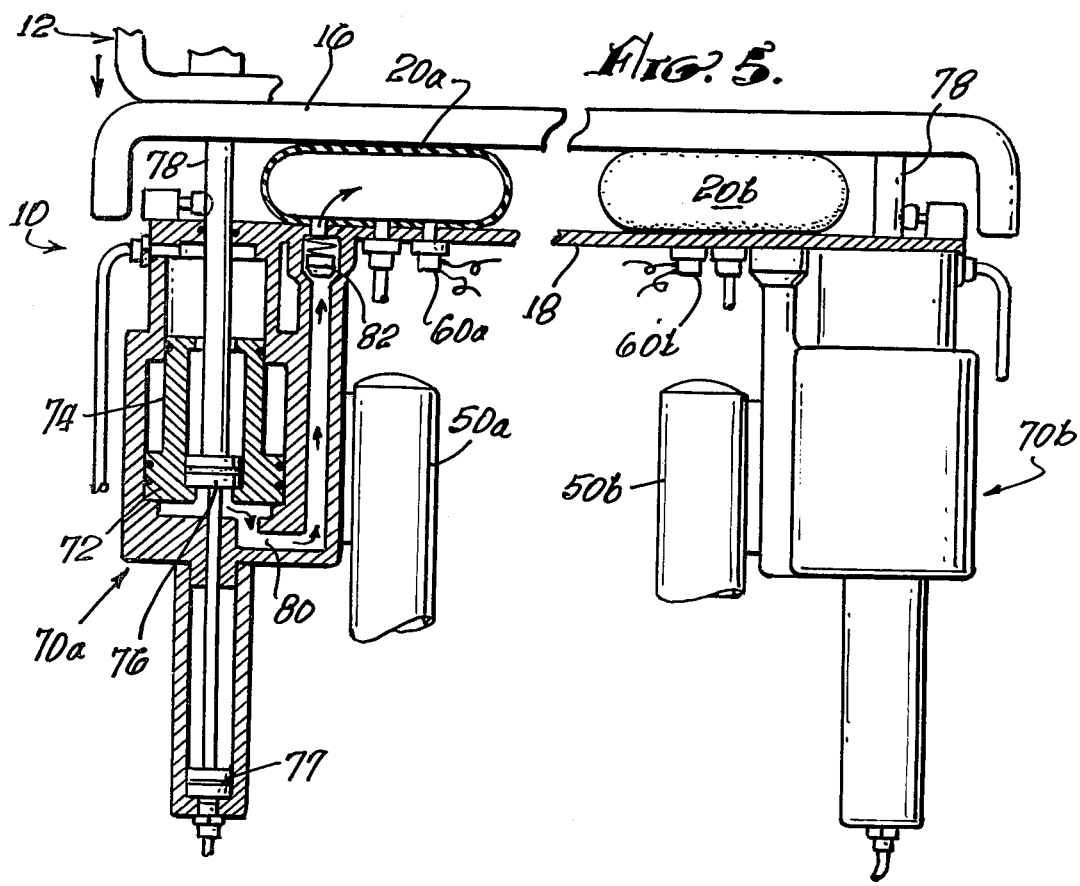
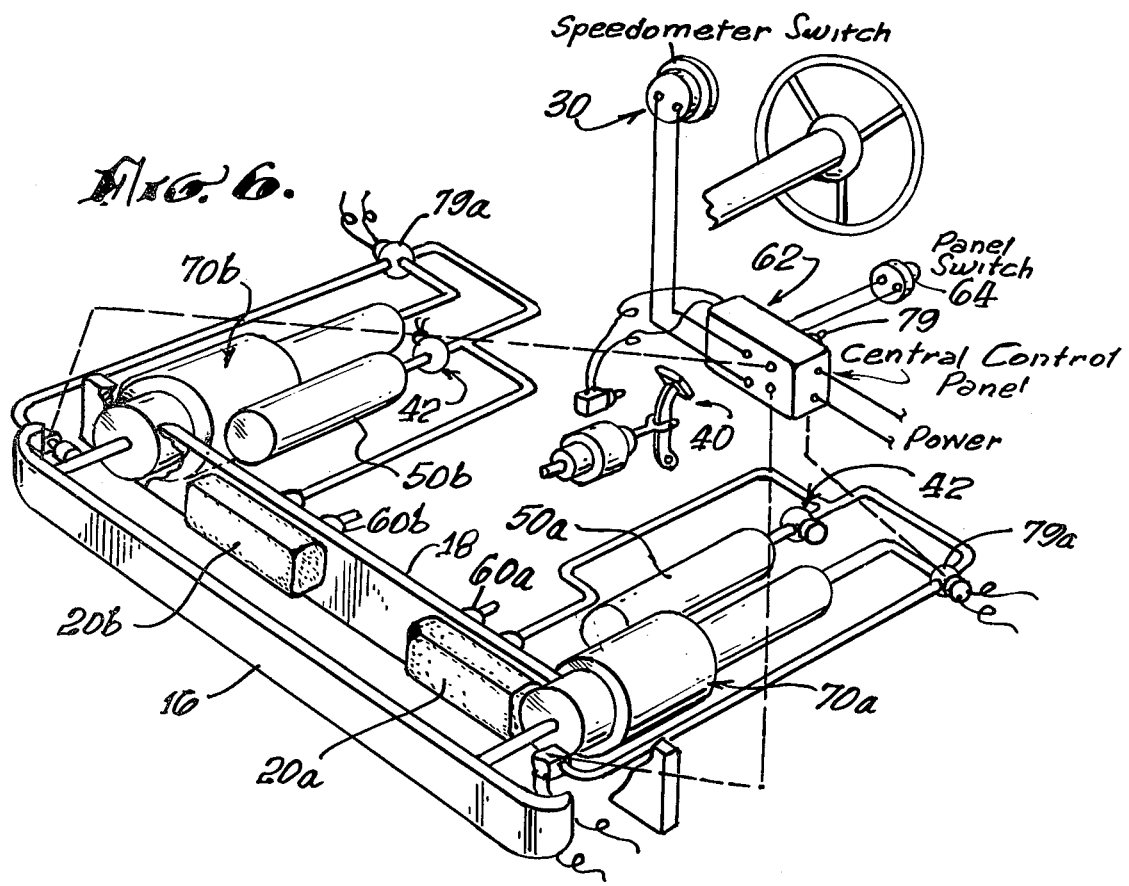

SAFETY APPARATUS AND METHOD FOR VEHICULAR IMPACT

CROSS REFERENCE TO RELATED PATENT APPLICATIONS

This invention is related to my issued U.S. Pat. No. 4,258,931 issued on Mar. 31, 1981, and to pending application bearing Ser. No. 159,868 filed on June 16, 1980. Both bearing the same titles of Air Bag System for Automobiles. In addition, I have yet another application on file entitled Safety Methanism for Impending Vehicular Impact filed Mar. 1, 1982 and bearing Ser. No. 353,079.

BACKGROUND OF THE INVENTION

1. Field of the Invention

This invention is in the general field of safety systems and apparatus for detecting and for preparing a vehicle for an impact with another vehicle or object in the path of the passenger vehicle carrying the device. The invention is directly placed on the operator's vehicle in such manner that it detects and prepares the operator's vehicle for a possible impact. The speed of the vehicle, along with strong pressure on the braking mechanism partially fills properly placed air bags with air. Further actual impact actuates mechanisms which fully protect the two impacting vehicles from severe damage and protects the passengers and operators of the vehicles from injury. If there is no final impact, then the preparatory steps are relieved, and are placed in readiness for another such impending incident.

2. Description of the Prior Art

There have been many attempts in the field of providing moving vehicles with devices to decrease the severe damage and injury during impact with other vehicles and objects. The most commonly known are those which employ shock absorbing springs and such devices that collapse against frictional resistance during the impact. No such devices are known by me are of the type that alertly prepare an impact absorbing situation to the extent that when actual impact occurs, the device is fully prepared for impact. Other mechanism, such as shock absorbers used for the smoother rides for passengers and cargo, have not been employed toward an impending impact situation should it be eminantly ready to occur.

SUMMARY OF THE INVENTION

The impact of two vehicles with one another, whether one is at rest or not, or impact with a vehicle with a stationary object has been a matter of concern the the safety organizations in this country and throughout the world for a long time.

In my granted U.S. Pat. No. 4,258,931 and my two recently filed and pending application, Ser. Nos. 159,868 and 353,079, I have attempted, and succeeded, with providing methods and apparatus for the prevention of serious damage to vehicles and injury to passengers of vehicles by such inventions.

The need, however, still remained for totally preparing a vehicle carrying such device, to a condition wherein it was to be partially ready during a warning period for an impact, and then to fully be prepared during the course of the impact itself.

I then came upon the idea which is contained in this patent application of locating devices and placing them to operate through a method for preparing such a vehicle for an impending impact.

It is an object of this invention to supply a vehicle with a detecting means for an impending impact with another vehicle or object.

It is yet another object of this invention to partially load such an impact absorbing means as employs air pressure being inserted into inflatable bags which in turn are placed between the bumpers of the automobiles and the bodies of such vehicles.

It is yet another object of this invention to fully fill such impact absorbing bags at the time of actual impact with sufficient air pressure so as to make the bags fully effecting in their job of protecting the vehicle and the passengers.

It is also an object of this method and apparatus to relieve such bags when the impending impact does not take place or after such impact has taken place and the device is reinstated for another impact.

These and further objects of this method and apparatus of my invention will become apparent to those skilled in the art upon reading the description of a preferred embodiment which follows, in conjunction with a review of the appended drawings.

BRIEF DESCRIPTION OF THE DRAWINGS

FIG. 1 is a schematic perspective of a vehicle approaching another vehicle or object and carrying detecting means to sense such approach;

FIG. 2 is a side elevation, in simplified form, showing an alternate embodiment wherein the detecting and impact preparing mechanisms are shown on the operator's vehicle;

FIG. 3 is a top plan view of the invention showing the apparatus in a non operative condition;

FIG. 4 is a view similar to FIG. 3, but showing the device prepared toward impending impact;

FIG. 5 is a view similar to FIGS. 3 and 4 wherein the impact has actually taken place; and FIG. 6 is a schematic perspective showing the mechanism with its components and with the interconnecting controls that operate such mechanism.

DESCRIPTION OF A PREFERRED EMBODIMENT

The invention, as shown in FIG. 1, illustrates a vehicle 10, which contains the impact detecting and actuating mechanisms and devices.

The vehicle is seen as approaching another vehicle 12, whether moving or stationary, and the detecting means 14 on the first vehicle senses that the speed which is different between the two vehicles has become in an impending impact condition.

The operator D of the vehicle automatically presses upon his brake, or the detection device gives notice that such an impending impact is possible, and thus the first step for preparing the mechanism for possible impact is taken.

This involves the release of air, or other gas, into airbags 20a, and 20b of the vehicle. This bags are placed in position in deflated condition between the bumper 16 and the main body portion 18. In the form shown in FIG. 2, it is shown that such air bags can be placed at the rear of the vehicle at 20c, and that two such bags are provided, when desired.

The speedometer 30, which indicates that the speed of the vehicle is in the range of dangerous impact conditions, now allows the triggering means to allow for the release of air into the protective air bags. This can be established at any speed which the manufacturer feels is necessary, or to the descretion of the operator of the vehicle. When such indication is complete, then the pressure on the brake pedal 40 allows the air to be placed in the bags through a solenoid valve 42. The air is shown as being supplied from air tanks 50a and 50b which can be replenished either by replacement of such air at servicing statins, and the like, or by reinstilling into the tanks air by methods as shown in my previously filed and issued patents that have been earlier noted.

If the impact does not take place, and when the impending impact conditions are relieved, then the air is withdrawn from the air bags by a solenoid valve arrangement at 60a and 60b either by an automatically timed interval by timer 62, or at the discretion of the vehicle operator by means of an electrical switch 64. The speedometer also is interconnected to the release valve when the vehicle is operating at slow speeds at a safe range.

The final impact upon the bumper by a severe force actuates the final air producing volume that is necessary for the air bags to be in their fullest filled condition.

The primary overall cylinders are shown at 70a and 70b. These are similar to the most recently filed patent application of mine and contain first pistons 72 and (these are both identical, so discussion of one is herewith shown, only) and their cooperative shafts 74. Second pistons 76, with their shafts 78 are shown as being interconnected with the bumper B and are actuated by this bumper at impact. A return piston 77 is shown which can be actuated by the operator by switch 79 and solenoid valve 79a when it is desired to return the bumper to its initial at rest position.

The double pistons 72 and 76 move enough air through the port 80 and one-way valve 82 to fully inflate the bags 20a and 20b. A solenoid valve at 60a allows the air to be released when it is obvious that the impact will not take place. The valve shown at 60a performs this function.

The replenishing of the air within the tanks 50a and 50b can be accomplished by the engine of the vehicle operating a compressor that can be hooked into the system, as was shown in a previous patent.

It has been shown herewith in this application that the general idea and theory of partially filling the shock absorbing air bags prior to an impact is unique in such manner that in order to supply a substantial amount of air into the bags at the instance of impact makes it difficult to completely fill the bags. The device and method as shown constantly provides that at impact there is an immediate filling of the balance of the volume within such bags that allows the absorption of the impact most effective.

The perspective of FIG. 6 shows the manner in which the various components can be easily brought together into an oerative system by known conventional switches and solenoit valves.

While the embodiments of this invention shown and described are fully capable of achieving the objects and advantages desired, it is to be understood that such embodiments have been shown and described solely for the purposes of illustration and not for purposes of limitation.

I claim:
1. The method of detecting an impact between a moving vehicle and another object or vehicle, and of preparing such first vehicle for such impending impact which comprises: providing air bag means between the bumper and body of said first vehicle; supplying an air source for filling such bags partially full; providing a control means for allowing such filling of said air bags to impact, said control means only allowing such filling when conditions are met that warrant such filling; providing a second air filling means for completely filling said air bags when actual impact occurs; means for releasing air from said bags after impact and when such conditions are not fully met that indicate an impending impact between said vehicle and said other object or vehicle.

2. The method of claim 1 wherein means are provided whereby the operator of said first vehicle releases said air from said air bags that is from said air source and from said second air filling means.

3. The method of claim 2 wherein: the detecting means for determining the proximity of said second vehicle or object is a radar detecting means and determining the relative speed between both vehicles by use of said detecting means.

4. The method of claim 2 wherein: the control means for the allowing of the filling of said air bags is a switch means and actuating said switch means by an excessive pressure on the vehicles brake pedal.

5. Apparatus for detecting an impending impact condition between a first and second vehicle and being located within said first vehicle and said apparatus providing means for partially preparing said first vehicle for such impact and for providing said first vehicle with a fully prepared means for absorbing the shock between said first and second objects during impact which comprises: an air bag means located between the bumper and vehicle body of said first vehicle; first air supply means for supplying air to said bags; control means for controlling the insertion of air from said air supply means into said air bags for partially filling said air bags; second air supply means for fully filling said air bags during actual impact of said bumper with a second vehicle or object; and means for relieving said air bags of said air when it is clear that there is no longer any danger of impending impact and when it is determined that such air be relieved from said air bags to return said air bags to their uninflated condition.

6. The apparatus of claim 5 wherein said detecting means is a radar means.

7. The apparatus of claim 5 wherein said air supply means which initially partially fills said air bags is a refillable container means.

8. The apparatus of claim 5 wherein said air bags may be located at the front and rear bumper arrangements of said first vehicle.

9. The apparatus of claim 5 wherein said first vehicle is provided with a speedometer indicating means which determines that such impact preparation method and apparatus would not be operable until certain speeds are being attained by said first vehicle.

* * * * *